United States Patent [19]
Yasuda et al.

[11] 3,945,193
[45] Mar. 23, 1976

[54] BATTERY HOLDER

[75] Inventors: Tetuya Yasuda, Tokyo; Yoshio Iinuma, Higashimurayama, both of Japan

[73] Assignee: Citizen Watch Co., Ltd., Tokyo, Japan

[22] Filed: Jan. 25, 1974

[21] Appl. No.: 436,822

[30] Foreign Application Priority Data
  Jan. 26, 1973  Japan............................ 48-10882

[52] U.S. Cl................ 58/23 BA; 58/88 R; 58/88 C
[51] Int. Cl.²........................................ G04C 3/00
[58] Field of Search.... 58/88 R, 88 C, 23 R, 23 BA, 58/53, 90

[56] References Cited
UNITED STATES PATENTS
3,597,913  8/1971  Fujimori.......................... 58/23 BA
3,672,154  6/1972  Hubner............................ 58/23 BA FOREIGN PATENTS OR APPLICATIONS
320,421  5/1957  Switzerland..................... 58/23 BA Primary Examiner—L. T. Hix
Assistant Examiner—U. Weldon
Attorney, Agent, or Firm—Sughrue, Rothwell, Mion, Zinn & Macpeak

[57] ABSTRACT

A holder unit of an electronic watch for holding a battery for the latter in position within the interior space of the casing of the watch, in which a holding member is attached to the watch casing, main portion of the holding member being arranged in a hollow cylinder enclosing with small idle gaps around said battery and mounted in the manner mechanically independent from the driven device.

8 Claims, 6 Drawing Figures

3,945,193

BATTERY HOLDER

BACKGROUND OF THE INVENTION

This invention relates to improvements in and relating to a battery holder as used in or on an electronic watch which comprises a battery, a driven device therefrom, such as watch movement, alarm device or the like, and a casing for housing and positioning said device.

Generally speaking over 95%, the batteries adapted for use as a power source for the electronic watch take the form of button-shaped products. These are generally the mercury or silver batteries and are mounted on the watch movement. When assembled, the battery, and the necessary electrical connections with the driven device must be established and maintained.

The holder must hold the battery in an easily overhaulable way and at the same time must bear substantial shocks and vibrations coming from outside.

The weight of the battery occupies a substantial part of the electronic watch including same, such as one third to one fifth of the total weight of the watch assembly.

SUMMARY OF THE INVENTION

It is a main object of the present invention to provide a battery holder by which the battery is retained in position and mechanically independent from the electrically driven device, such as the watch movement.

A further object is to provide the battery holder of the above kind and capable of housing the battery in a highly stabilized, yet, when necessary, detachable way.

Still a further object is to provide the battery holder which holds the battery in a highly protected way against outside shocks and vibrations. It is proposed to provide, according to this invention, a battery holder for an electronic watch, characterized in that said battery is detachably mounted in a holding member, the main portion of which is arranged in a hollow cylinder enclosing with small idle gaps around said battery, said holding member being attached to a watch casing of said watch and mounted mechanically independent from the driven device, namely the watch movement contained in the watch casing.

These and further objects and features will become more apparent when read the following detailed description of several preferred embodiments of the invention by reference to the accompanying drawings in which:

DETAILED DESCRIPTION OF THE INVENTION

Referring now to accompanying drawings, several preferred embodiments of the invention will be described in detail.

Figure 1:
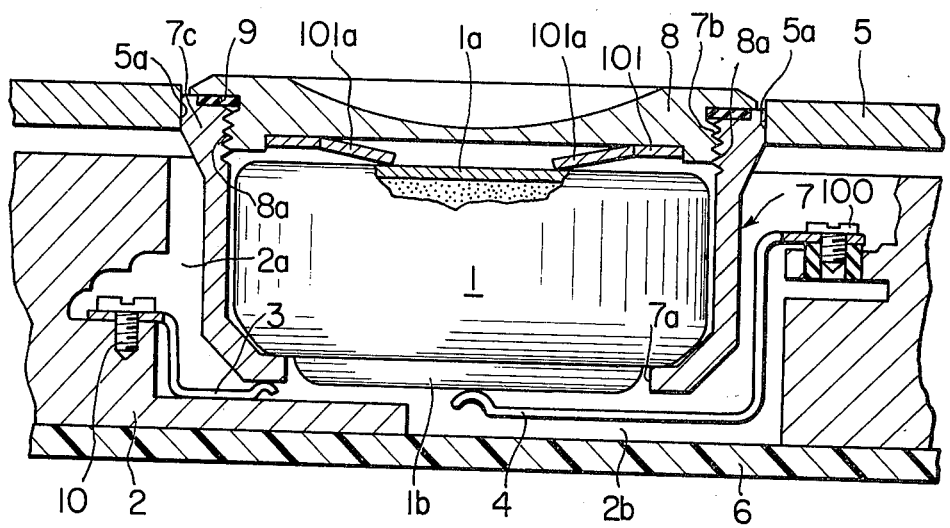
FIG. 1 is a substantially sectional view of a first embodiment of the invention.

In FIG. 1, showing the first embodiment, numeral 1 represents a conventional button type battery, having a positive pole 1a and a projecting negative pole 1b.

Numeral 2 represents a device driven by the battery, preferably an electronic watch movement, an electric alarm device or the like. This driven device 2 has been shown, only partially and schematically and as if it be a solid mass. However, it comprises various known inner working parts which do not constitute part of the invention and thus have been omitted from the drawing for simplicity.

Numeral 5 represents only partially a conventional watch case having a circular opening 5a cut therethrough, and numeral 6 represents only partially a watch dial.

A cup-shaped holder element 7 is fixedly held by its upper thickened flange portion 7c at the reception opening 5a of the watch case, by press fit or the like conventional means. The holder element 7 is formed with a concentric bottom opening 7a for keeping the negative pole 1b of the battery 1 held in position within the interior space of the cup 7, leaving a small ring idle gap formed around the pole 1b. The upper flange portion 7c of the holder element is formed with female threads 7b for tightly receiving a correspondingly threaded male portion 8a of a disc-like cover 8 in position as shown. Thus, these elements 7 and 8 constitute in combination a battery holder.

The driven device, preferably watch movement, 2 is formed with a space 2a for substantially surrounding the battery holder 7 and 8 which houses, in turn, the battery 1, and a bottom opening 2b kept in free communication with the said space 2a. As seen from FIG. 1, there is provided a gap between the outer peripheral surface of holder element 7 and the inner wall surface of the device 2, defining said space 2a. A sealing ring 9 is placed between the holder elements 7 and 8.

A positive side resilient terminal strip 3 is fixed at its root end to the device 2 by means of a set screw 10, the tip end of said strip being kept in pressure contact with the bottom of the cup 7 for current-conducting service. The threaded connection between the both elements 7 and 8 may be replaced by a snap joint or bayonet connection, although not shown.

Numeral 4 represents a negative resilient terminal strip the root end portion of which is fixedly attached to screw terminal 100 mounted on a part of the device 2, as shown. Although not shown, a lead extends from the terminal 100 to a selected point of an electronic drive circuit contained in the device 2 for the completion of the current passage.

A ring spring 101 having a plurality of radial arms 101a is inserted under pressure between the positive electrode 1a of the battery and the bottom surface of cover 8, for holding the battery in position and for serving at the same time as a current conductor. A further lead, not shown, extends from the set screw 10 acting as a terminal, for conducting current therefrom to the said electronic circuit, although not shown.

It will thus be seen from the foregoing, current will flow from the positive pole 1a through the constituting members 101; 8; 7 and 3 to the positive terminal post 10, thence to the electronic drive circuit. On the other hand, current will flow from the circuit to the negative terminal post 100, thence through negative contact strip 4 to the negative pole 1*b* of the battery.

For testing the inner working elements of the device 2 before insertion of the battery, an outside current source can be connected to the resilient contacts 3 and 4. Or alternatively, proper auxiliary conducting means such as metallic jig means can be utilized for conducting connection of a battery to the resilient contacts.

After testing the device 2, the battery 1 is inserted in the first holder element 7 and the cover 8 or second holder element, together with pressure spring ring 101, is coupled with the first holder element. The thus preassembled battery-holder sealed unit can be inserted from above through the corresponding opening 5*a* into the casing 5, or more specifically into the space 2*a* until the bottom of the first holder element 7 is brought into pressure contact with the resilient contact 3 and the battery brought into contact with contact 4.

For removal of the battery 1 from position, it suffices to release the cover or second holder element 8. This procedure is highly convenient. In the conventional battery holder, several small screws must be unscrewed. Thus, the second holder element serves as a battery exchange service means.

Since the battery is held in position firmly within the mechanically rigid holder assembly 7; 8 which is held in turn by and within the watch casing 5, outside shocks and vibrations as applied to the battery could not be transmitted to the driven device 2 which may generally be a kind of delicate and highly sensitive one, such as a watch movement. Therefore, it is not necessary to fit certain delicate battery holder means to the device 2 per se.

In the conventional technique, at least a mechanically rigid support member must be provided between the dial and the battery. According to the invention, the provision of such rigid mechanical means can be dispensed with. It suffices to provide a thin resilient conducting means such as contact 4 or the like. These means may serve substantially exclusively as electricity conducting means. Thus, there is no mechanical rigidity between the battery and the dial.

On the other hand, the holder assembly 7;8 represents effects dust sealing and moisture proof functions as well as mechanical protection and current-conducting performance. In addition, its unique structure guarantees against a false electrical connection. The user may not fear, therefore, of an occurence of the polarity-reversed connection.

Conventional troublesome use of small screws which must be manipulated at each battery exchange can be avoided according to this invention, as was referred to hereinbefore.

Although not specifically referred to, these merits are also obtained in the case of further several embodiments to be described.

Figure 2:
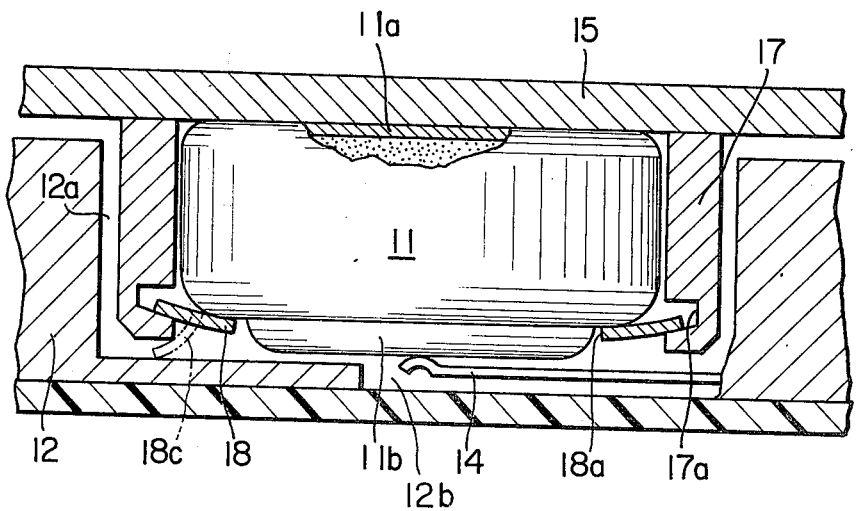
FIG. 2 is a similar view to FIG. 1, yet illustrating a second embodiment of the invention.
Figure 3:
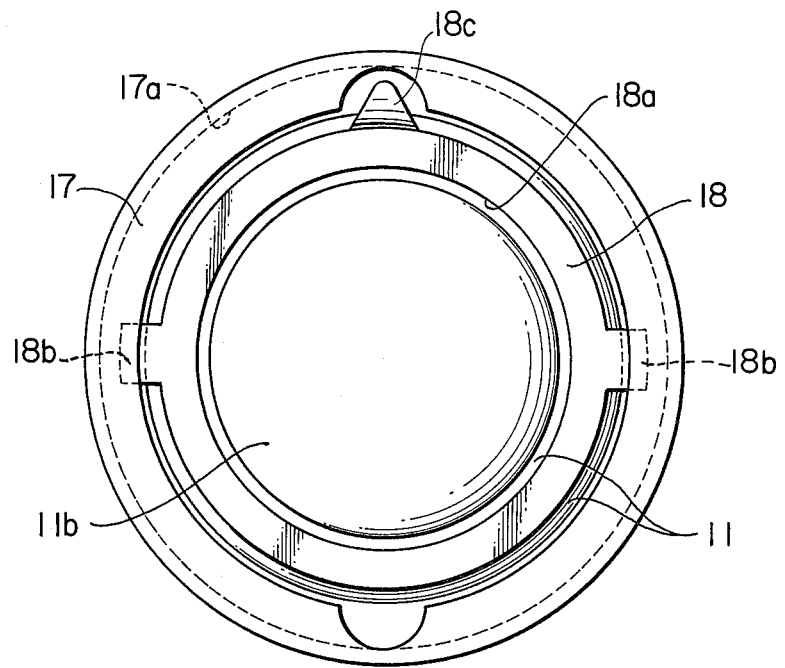
FIG. 3 is an inverted plan view of several main constituent parts of the second embodiment shown in FIG. 2.

Next, referring to FIGS. 2 and 3, the second embodiment will be described in detail.

It should be mentioned that each corresponding part to that employed in the foregoing first embodiment will be denoted with the same reference numeral as before, yet having been added with 10.

In this embodiment, numeral 17 represents a first holder element formed into a hollow cylinder having an inner ring groove 17*a* and being fixedly attached at its upper end, by welding or the like means, with a watch case 15 only partially shown. Numeral 18 represents a second holder element formed into a dished ring having a central large opening 18*a* and a plurality of radially and outwardly extending projections 18*b* kept in pressure engagement with said ring groove 17*a*. The second holder element 18 is further formed with an outwardly and downwardly projecting tongue contact 18*c* adapted for establishing electrical and pressure contact with a conducting spot on a driven device 12, said spot which, although not specifically shown, may take a conducting strip or post as at 10 shown in FIG. 1.

Numeral 11 represents a battery having a positive pole 11*a* and a projecting negative pole 11*b*. Numeral 14 represents a negative resilient contact strip 14 which may be similar to that shown in 4 in FIG. 1. Numeral 15 represents a watch cover which may be similar to that shown at 5 in FIG. 1. 12*a* and 12*b* represent a housing space and a bottom opening, respectively, as shown at 2*a* and 2*b* in FIG. 1.

When assembling, before insertion of the device 12 in position the battery 11 is inserted, into the first holder element 17, and then, the second holder element 18 is bridged under pressure between the battery, excluding the downwardly projecting negative pole 11*b*, and the ring groove 17*a* for keeping the battery in position as shown. Then, the device 12 is inserted in position within the interior space of the watch casing 15 so that the battery-holder assembly 11; 17 is substantially housed in the space 12*a* of the device 12. In this position, the positive tongue connector 18*c* will make a resilient, positive electrical connection with the device 12. On the other hand, the negative connection of the negative pole 11*b* and the device 12 is brought about through the intermediary of the resilient strip contact 14, in a similar manner with the contact strip 4 in the first embodiment. Thus, in the present second embodiment, use of the positive contact strip 3 as employed in the first embodiment has been dispensed with, for attainment of a more easy assembly with least possible number of constituting parts. If necessary, however, a similar resilient positive contact as at 3 may be added.

The member 15 may be a detachable back cover of the watch. In this case, a disengagement of the back cover from position will also remove the holder 17;18, holding the battery in position, may be shifted correspondingly from position. The battery 11 is disconnected naturally from the device 12. Then, the battery can be disengaged from the holder assembly after execution of such removal of the back cover.

Figure 4:
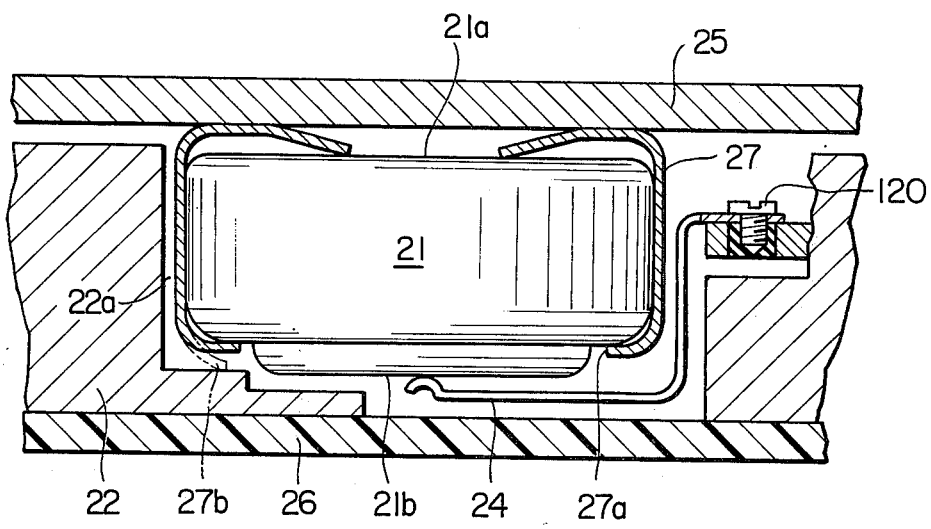
FIG. 4 is a similar view to FIG. 1, yet illustrating a third embodiment of the invention.
Figure 5:
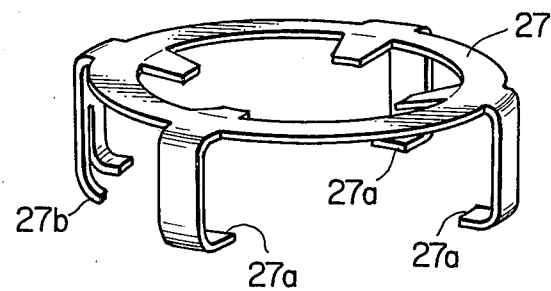
FIG. 5 is a perspective view of a battery holding member as employed in the third embodiment.

In the case of the third embodiment shown in FIGS. 4 and 5, it should be noted that each of the corresponding constituent parts is denoted with the same reference numeral as used in the first embodiment, yet having been added with 20.

In this embodiment, the first and second holder elements used in the foregoing embodiments have been united into a single holder 27 which is fixedly attached to a watch case 25 as by welding, riveting or the like conventional fixing means, although not shown. This holder 27 has a bottom opening 27*a* for allowing the negative projecting pole 21*b* of a battery 21 to project downwards with a small peripheral idle gap as before. The holder 27 is formed with a downwardly and inwardly projecting connection tongue 27*b*, acting as a resilient contact as at 18*c* shown in FIG. 2.

As seen from FIG. 5, the holder 27 has a simple resemblance to a rough cage, thus representing a general resiliency as well as a local flexibility at each projecting part. Therefore, the removal of the battery 21 from the holder can be easily performed by resiliently deforming the whole structure or one or more battery-holding projections as at 27a. By employing the overall resilient one piece structure of the holder 27, the manufacture and assembly thereof can be highly economized. In addition, the overall occupying space of the holder can be minimized. Other constituent parts are similar to those adopted in the first embodiment so that any person skilled in the art can easily be understood the structure and function of the present invention, without further detailed analysis.

Figure 6:
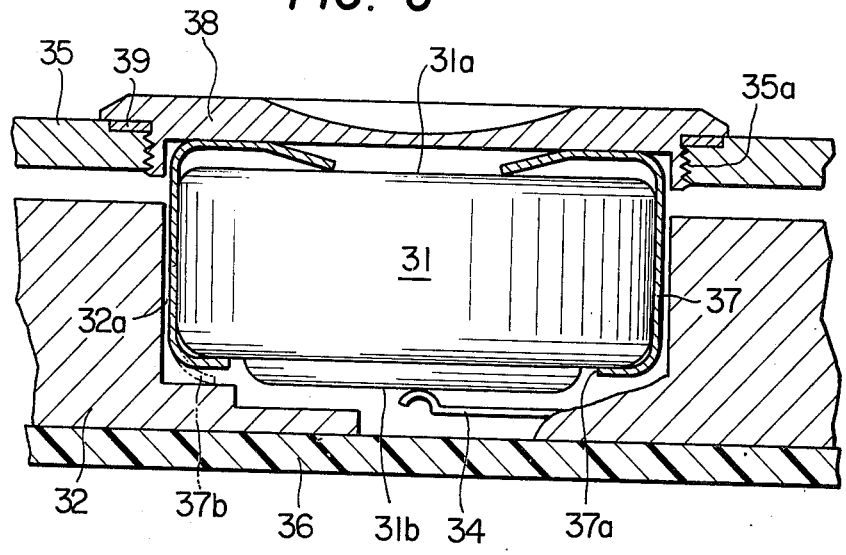
FIG. 6 is a similar view to FIG. 1, yet showing a fourth embodiment of the invention.

In FIG. 6, the fourth embodiment is shown.

It should be noted that each of the corresponding constituent parts to those employed in the first embodiment has been denoted with the same reference numerals as before, yet being added with 30.

In this embodiment, a holder 37 has a similar structure as that of the foregoing holder 27, but it has been fixedly attached to the bottom surface of a screw cap 38, by welding, riveting or the like conventional fixing means. This cap 38 is threadedly attached to a watch casing 35 at its female threaded opening 35a.

The holder 37 is formed with a central bottom opening 37a which is similar to that shown at 27a in FIG. 4. It is further formed with a resilient tongue 37b which has similar structure and function as those of the foregoing tongue contact shown at 27b in FIG. 6. Positive and negative poles 31a and 31b are similar to those shown at 12a and 12b in FIG. 4. Negative contact strip 34 corresponds to that shown at 24 in FIG. 4.

By detaching the screw cap 38, the battery-holder assembly 31; 37 can be easily taken out from outside of the watch casing.

The embodiments of the invention in which an exclusive property or privilege is claimed are as follows:

1. In a battery powered watch having a case on one side, a dial on an opposite side, a watch mechanism disposed between the case and dial, and a battery having a first pole and a second pole protruding from one side of the battery, the improved battery holder comprising:
   a. means attached to said case to attach said battery to said case wherein said battery is located on the side of said case facing the dial, such that said battery remains attached to the case upon removal of the case from the watch, said attachment means being in electrical contact with said first pole of said battery;
   b. first flexible terminal means electrically connecting said attachment means to said watch mechanism; and
   c. second flexible terminal means electrically connecting the second, protruding pole of said battery to said watch mechanism.

2. The improved battery holder of claim 1, wherein said attachment means comprises:
   a. a cup shaped member defining a battery chamber, having a hole through the closed end wall, said hole having a diameter larger than the diameter of said second pole protruding from said battery but smaller than the outer diameter of the battery so as to engage an end of the battery while allowing the pole to protrude therethrough; the outer periphery of the open end of said member being attached to the inner periphery of a hole through said case;
   b. a cover portion removably engaging said open end of said cup shaped member; and
   c. spring means interposed between said cover portion and said battery to urge said battery toward said closed end wall of said cup shaped member.

3. The improved battery holder of claim 1, wherein said attachment means comprises:
   a. a generally cylindrical member having one end attached to said case to define a battery chamber, and a groove about the inner periphery adjacent the opposite end of said member; and
   b. a generally annular shaped holder element having an inner diameter larger than the diameter of the protruding pole of the battery, but smaller than the outer diameter of the battery and having a plurality of tabs radially projecting from the outer periphery, said tabs engaging said groove in said cylindrical member to retain said holder element and said battery therein.

4. The improved battery holder of claim 3, wherein said first flexible terminal means is integrally formed with said annular shaped holder element.

5. The improved battery holder of claim 1, wherein said attachment means comprises:
   a. an annular member having a plurality of depending legs, each of said legs having a radially inwardly curved end portion, the curved ends of said legs defining a circle having a diameter larger than that of the battery protruding pole but smaller than the outer diameter of the battery so as to retain the battery between the curved ends and said annular member; and
   b. means to attach said annular member to said case.

6. The improved battery holder of claim 5, wherein said first flexible terminal means is formed integrally with one of said plurality of depending legs.

7. The improved battery holder of claim 5, wherein said annular member has a plurality of spring members protruding radially inwardly therefrom to urge the battery toward said curved end portion of said depending legs.

8. The improved battery holder of claim 5, wherein said means to attach said annular member to said case comprises a cap having said annular member attached thereto, said cap threadingly engaging the inner threaded periphery of a hole through said case.

* * * * *